United States Patent [19]

Swanson

[11] 3,964,797
[45] June 22, 1976

[54] TRACK SHOE WITH STAGGERED GROUSERS

[75] Inventor: Fred T. Swanson, Trivoli, Ill.

[73] Assignee: Caterpillar Tractor Co., Peoria, Ill.

[22] Filed: Mar. 3, 1975

[21] Appl. No.: 555,334

[52] U.S. Cl. .................................. 305/54; 305/19
[51] Int. Cl.² .................................. B62D 55/28
[58] Field of Search ............... 305/19, 34, 35 R, 53, 305/54; 180/9.2 R

[56] References Cited
UNITED STATES PATENTS

| | | | |
|---|---|---|---|
| 2,470,801 | 5/1949 | Boltman | 305/53 |
| 2,849,259 | 8/1958 | Engstrom | 305/54 |
| 3,802,751 | 4/1974 | Beyers | 305/38 |
| 3,871,720 | 3/1975 | Mosshart | 305/54 |

Primary Examiner—M. H. Wood, Jr.
Assistant Examiner—John A. Carroll
Attorney, Agent, or Firm—Charles E. Lanchantin, Jr.

[57] ABSTRACT

A track shoe with staggered grousers includes an elongated rectangular planar body portion with a predetermined leading edge, a trailing edge, a pair of side edges and a flat outer wear surface thereon and having a leading grouser extending integrally outwardly from the wear surface in parallel juxtaposed relation to the leading edge centrally thereof, and with a pair of laterally spaced trailing grousers extending integrally outwardly from the wear surface in parallel juxtaposed relation to the trailing edge and laterally inwardly from the side edges, to cause adhering mud or the like to be released from entrapment between the leading grouser, the trailing grousers and the wear surface of the planar body portion for improved penetration and traction.

4 Claims, 4 Drawing Figures

U.S. Patent June 22, 1976 Sheet 1 of 2 3,964,797
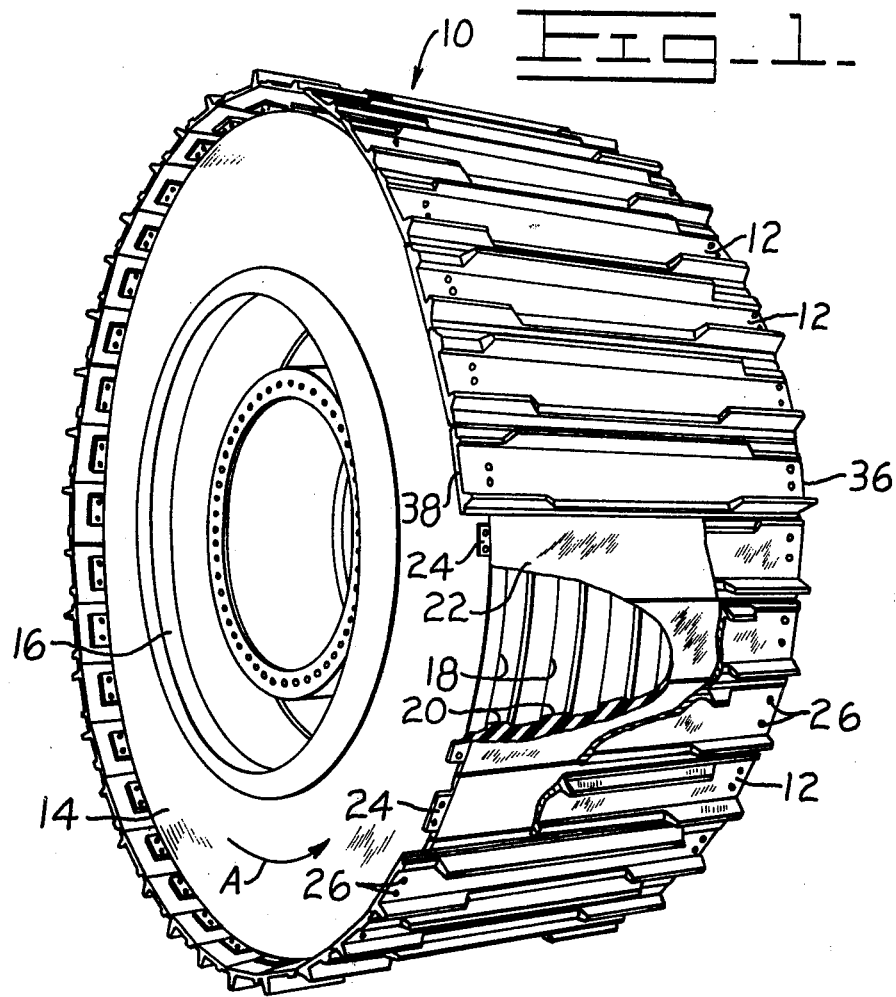
Fig-1-
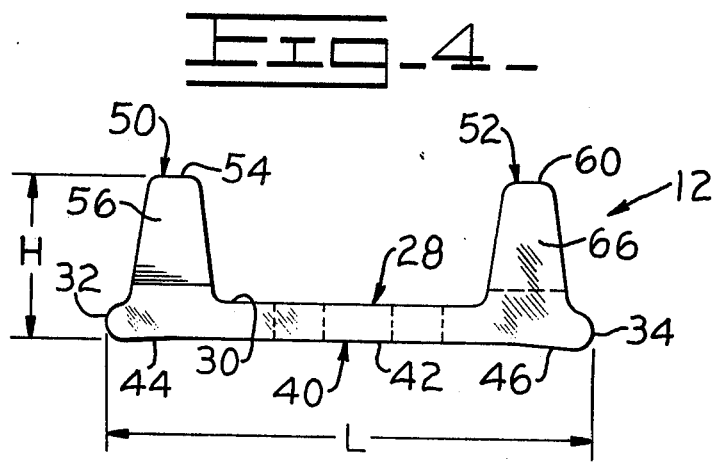
Fig-4-

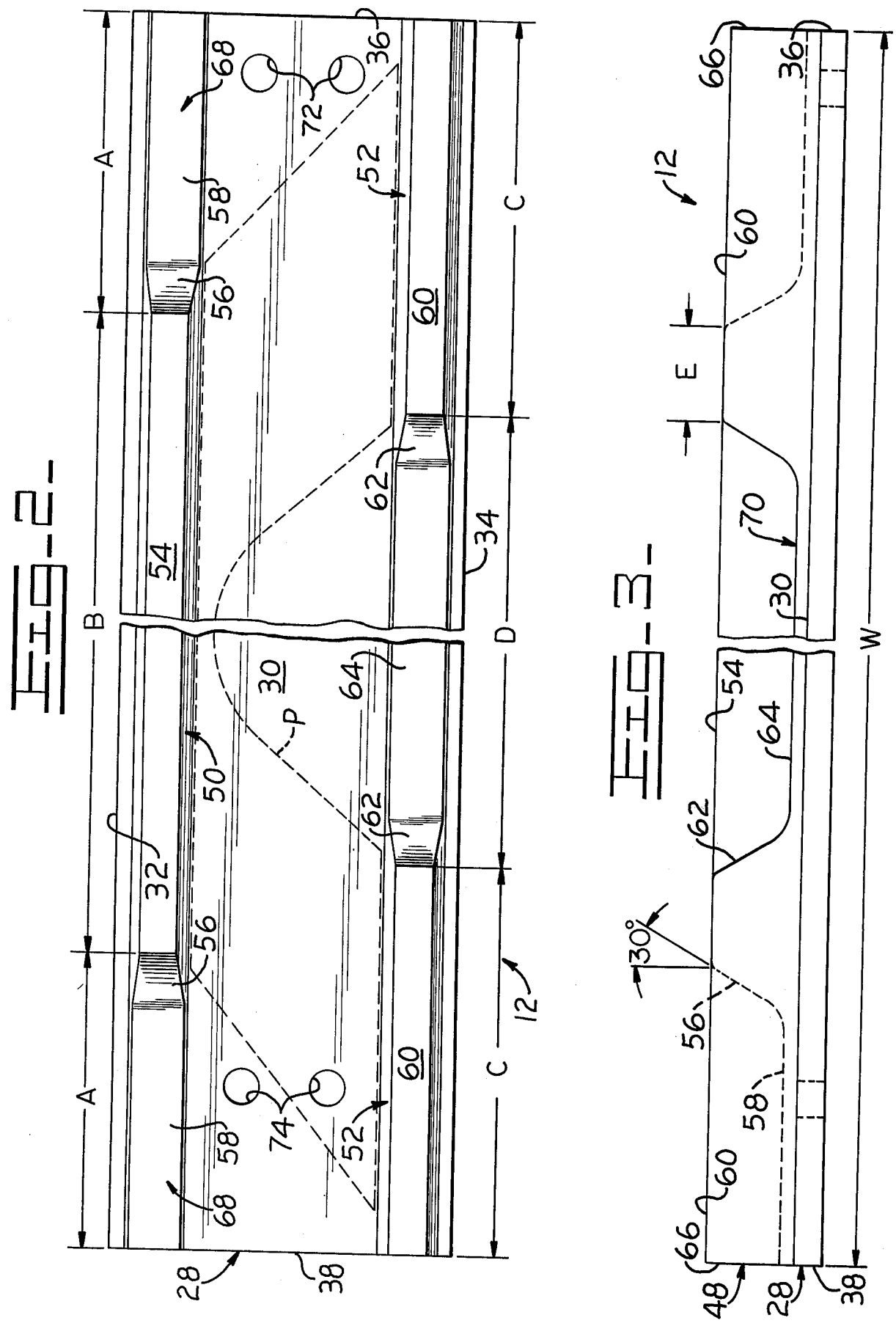

TRACK SHOE WITH STAGGERED GROUSERS

BACKGROUND OF THE INVENTION

Vehicles with ground-engaging endless track chain assemblies have been recognized for their ability to traverse over rough and muddy terrain while exhibiting a high drawbar pull-to-weight ratio. Accordingly, the track chain assemblies, and particularly the individual track shoes thereof, have experienced considerable research development. The standard track shoe consists of a steel plate with a single grouser or cleat running across its width. While this generally affords good traction, such single grouser track shoes will not grip on frozen ground and they tend to damage the surfaces over which they travel. They also suffer the disadvantage of shoe instability or rocking.

Alternately, two or three grouser track shoes are used because they do not dig up the ground in spinning or turning as much as a single grouser, and they retain more traction than a substantially flat track shoe. Other considerations, such as strength and wear characteristics, and the ability of the shoes to maintain traction although being exposed to clogging mud and icing conditions, are also of paramount importance.

The specific construction of track shoes is also complicated when they are removably secured to a cylindrical mounting belt which is disposed about the periphery of a rubber tire. Such flexible track belt assemblies are used on rubber tired vehicles in order to increase traction, improve flotation and protect the pneumatic carcass from penetration by foreign objects. Reference is made to the flexible track belt assemblies disclosed in U.S. Pat. No. 3,601,212, issued Aug. 24, 1971 to R. A. Peterson et al; U.S. Pat. No. 3,773,394 issued Nov. 20, 1973 to C. E. Grawey and U.S. Pat. No. 3,776,291 issued Dec. 4, 1973 to R. L. Boggs and which are assigned to the assignee of the present invention. In general, the track belt assemblies of the aforementioned patents utlize a plurality of closely coupled track shoes with multiple grousers, because single grouser shoes suffer from the various deficiencies enumerated above.

Double grouser track shoes are particularly desirable in the environment of a flexible track belt assembly and rubber tire. One reason is that the double grouser shoes generally exhibit a heavier longitudinal cross section, including a higher grouser, and this provides additional service wear life. This is particularly beneficial when the vehicle is operated in rock. Another feature is that such shoes may more conveniently be secured to the mounting belts by incorporating suitable fastening devices in the recesses between the two grousers. A further advantage involves improved vibration control through decreased chordal action of the relatively short length shoes and double grousers.

Unfortunately, as a result of mud packing between the grousers, the double grouser track shoes experience a decrease in traction and consequently a tendency of the flexible track belt assemblies to slip in the normal driving direction, as well as a tendency of the vehicle to slip sideways when it is being operated on side slopes. Such adverse operating conditions are naturally aggravated by the usual freezing and thawing conditions accompanying seasonal changes.

For reasons of manufacturing economy, double grouser shoes are preferably rollably formed from hot steel in the direction of the grousers. Therefore, these shoes have a substantially uniform cross section transverse thereto. This manufacturing method substantially eliminates the adoption of complex grouser designs, such as those having diagonal or chevron grouser shapes which could improve the side hill stability of the shoes.

Many of the prior art track shoes are simply not adaptable to various dry and muddy ground conditions or are simple enough in construction to be economical. Frequently, they have various dead-end openings and crevices in which mud and the like can compact, and this markedly reduces the effective tractive effort thereof. Representative of such shoes is U.S. Pat. No. 2,389,156 issued Nov. 20, 1945 to H. A. Knox. Besides having the aforementioned disadvantages, the laterally spaced cleats of the reference patent extend outwardly cantileverably beyond the side edges of the shoe, thus decreasing the flotation capability for a give overall width. Also, the cantilevered cleats are not only relatively unprotected from damage, but also would act like the teeth of a saw to abrad against any object on the side thereof. Another disadvantage of the referenced shoe is the decreased stiffness or lateral beam strength of the shoe due to the discontinuous nature of the cleats when taken in conjunction with the longitudinal section of the irregular cast frame.

SUMMARY AND OBJECTS OF THE INVENTION

Accordingly, it is an object of the present invention to provide an improved multi-grouser track shoe so constructed as to allow release of mud from entrapment between the grousers for improved traction.

Another object of the present invention is to provide an improved multi-grouser track shoe which is operationally effective under dry or muddy ground conditions and also exhibits an increased resistance to sideway movement.

Another object of the present invention is to provide an improved track shoe having the aforementioned characteristics which is further able to be economically produced from a hot rolled section.

Other objects and advantages of the present invention, including the adaptability of such a shoe to the cylindrical mounting belt of a rubber tired vehicle, will become readily apparent upon reference to the accompanying drawings and the following description.

BRIEF DESCRIPTION OF THE DRAWINGS

FIG. 1 is a three-dimensional view of an endless flexible track belt assembly including a plurality of track shoes constructed in accordance with the present invention.

FIG. 2 is an enlarged top plan view of one of the track shoes shown in FIG. 1.

FIG. 3 is an elevational view of the trailing end of the track shoe shown in FIG. 2.

FIG. 4 is a side elevational view of the track shoe shown in FIGS. 2 and 3.

DESCRIPTION OF THE PREFERRED EMBODIMENT

Referring to FIG. 1 of the drawings, an endless flexible track belt assembly 10 includes a plurality of relatively closely peripherally spaced rectangular track shoes 12 having the improved construction of the present invention. The track belt assembly is mounted circumferentially on a pneumatically supported rubber tire carcass or tire 14, and the tire is suitably mounted on an earth-moving vehicle or the like (not shown) by a conventional rim and adapter arrangement 16. A plurality of peripheral grooves 18 are formed in the tire for laterally interlocking engagement with a corresponding plurality of internal rubber ribs 20 of a cylindrical mounting belt 22. The substantially inextensible mounting belt is replaceable, and a plurality of retaining members or keepers 24 are integrally secured thereto equally about the periphery of its opposite sides. In this way the track shoes are removably secured to the keepers and to the belt, as by a plurality of retaining bolts 26. Such mounting of the shoes to the mounting belt and interlocking engagement with the tire, and accompanying advantages thereof, is more precisely discussed and elaborated on in U.S. Pat. No. 3,773,394 mentioned above.

As clearly illustrated in FIGS. 2, 3 and 4, the relatively wide track shoes 12 of the present invention individually have an elongated rectangular planar body portion 28 defining a substantially flat outer wear surface 30, a predeterminedleading edge 32, a trailing edge 34, an inside edge 36 and an opposite outside edge 38 to provide a relatively clean periphery. As best shown in FIG. 4, each shoe further has a bottom mountinhg surface 40 thereon with three identifiable portions including a centrally disposed inner planar surface 42, a leading edge inner surface 44 and a trailing edge inner surface 46 which extend oppositely cantably inwardly away from the planar surface 42 to better match the contour of the cylindrical mounting belt 22. Such contoured mounting surface is better disclosed in U.S. Pat. No. 3,802,751 issued Apr. 9, 1974 to M. E. Beyers and assigned to the assignee of the present invention.

More specifically, and as best shown in FIGS. 2 and 3, each track shoe 12 of the present invention has a staggered grouser arrangement 48 thereon fully peripherally within it, including a relatively wide and centrally disposed leading grouser 50 and a pair of relatively narrower laterally spaced trailing grousers 52 which extend integrally outwardly from wear surface 30 of the body portion 28. It is to be noted that the leading grouser is disposed in parallel juxataposed relation to the leading edge 32 and has an outer wear surface 54 with a width B disposed a similar distance A from the opposite side edges 36 and 38. A pair of divergingly inclined shoulders 56 extend inwardly in longitudinally aligned relation from the outer wear surface of the leading grouser to blend with a corresponding pair of relatively flat footings 58. In a somewhat similar, but reversed manner, the trailing grousers are disposed in parallel juxtaposed relation to the trailing edge 34 and individually have an outer wear surface 60 with a width C laterally separated a distance D from one another. Further, the trailing grousers have a pair of convergingly inclined shoulders 62 which extend inwardly from the outer wear surfaces 60 to blend with a centrally disposed and relatively flat footing 64. Preferably, the shoulders 46 and 62 are inclined at an angle of 30° from the vertical as generally indicated in FIG. 3.

Attention is drawn to the fact that the aforementioned construction of the track shoes 12 lends itself to being economically manufactured by rollably forming the shoes from hot steel or the like in the direction of the grousers. After hot working of the rollably formed strip, it is sheared or otherwise cut transversely to the grousers to make the individual shoes. This provides an upright end wall 66 at the outward end of the grousers which is coplanar with the respective edges 36 and 38. Material is thereafter removed from the leading full width grouser (not shown) by cutting or machining to provide a pair of opposite end notches indicated generally by the reference numeral 68 in FIG. 2 and also the flat footings 58. Similarly, material is removed from the trailing full width grouser (not shown) to define a slot 70 centrally thereof and the flat footing 64. Thereafter, a pair of inside bolt holes 72 and a pair of outside bolt holes 74 are formed through the body portion 28 of the shoes at laterally different distances from their respective side edges 36 and 38. Incidentally, it will be appreciated from viewing FIG. 4, that the grousers are divergingly tapered in section from the outer wear surfaces 54 and 60 inwardly toward the body portion 28 to provide additional strength thereto.

In the particular track shoe 12 illustrated in FIGS. 2, 3 and 4 by way of example, the width W is 38 in. (96.5 cm), the length L is 7 inches (17.8 cm) and the height H is approximately 2.5 inches (6.4 cm). Also, the leading grouser outer wear surface 54 has a width B of 26 inches (66.0 cm) and each trailing grouser outer wear surface 60 has a width C of 8 inches (20.3 cm). Thus, in accordance with one aspect of the present invention, the leading grouser 50 laterally overlaps the trailing grousers 52 in the normal direction of travel by an amount indicated by the distance E in FIG. 3, of by 2 inches (5.1 cm).

With the aforementioned dimensions in mind, it will be appreciated that the staggered grouser track shoe 12 of the present invention provides a relatively wide leading grouser 50 having a width of approximately 70% of the overall shoe width, a relatively individually narrower width pair of grousers 52 having a collective width of approximately 40% of the overall width, and an overlap relationship between the leading and trailing grousers of approximately 5% of the overall width. Thus, the grousers of the present invention have a greater ability of penetrate the earth because of the higher unit loading of the wear surfaces 54 and 60, when compared to the full width dual grouser systems of prior art.

Operation

While the operation of the present invention is believed clearly apparent from the foregoing description, further amplification will subsequently be made in the following brief summary of such operation. In operation, as the tire 14 shown in FIG. 1 is powerably rotated in the direction of the arrow identified by the letter A, the tractive effort achieved by the shoes 12 of the present invention in sticky mud, wet clay or the like is appreciably improved. The track shoes are installed on the cylindrical mounting belt 22 in such a manner that the relatively wide leading grouser 50 always engages the ground first in the predetermined forward direction of vehicle travel as indicated. This is normally the direction of maximum drawbar pull and, consequently, maximum soil packing. As the mounting belt flexes coming out of the foot print, the adjacent track shoes form an angle with one another. This flexing breaks compacted soil in front of the leading grouser 50 and causes it to loosen and fall out. Because of the specific construction of the staggered grousers 50 and 52, the longitudinally cooperating end notches 68 and the central slot 70, and also the flat outer wear surface 30 of the rectangular body portion 28, the track shoes of the present invention may be generally referred to as "self-cleaning". With such construction, adhering mud experiences shearing movement during contact of the shoes with the ground longitudinally rearwardly of the leading grouser and through the central slot 70, and also longitudinally rearwardly of the trailing grousers of one shoe with respect to the end notches of the adjacent shoe to result in a marked improvement in traction. Adding to this self-cleaning capability is the location of the grousers adjacent the leading and trailing edges 32 and 34 of the shoes, where relative motion is experienced between the shoes during operation of the tire. Naturally also, as the rotational speed of the tire is increased, there is a greater tendency for mud to be propelled radially outwardly from the tire due to centrifugal force.

As best shown in FIG. 1, the staggered grouser track shoes 12 of the present invention are removably secured by the retaining bolts 26 to the keepers 24 of the cylindrical mounting belt 22 in such a manner that the outside edge 38 extends laterally outwardly of the tire carcass 14 further than the inside edge 36. This is due to the laterally different spacing of the bolt holes 72 and 74 as clearly shown in FIG. 2. Such increased overhang gives additional protection to the outer side wall of the tire carcass during operation thereof.

Side hill stability of the track shoes 12 is also improved by the construction of the grousers 50 and 52. Particularly, while mud or the like tends to beneficially break away from the entire area of the flat outer wear surface 30 in an improved manner, in extremely severe field conditions mud may only be limitedly released in the area of the end notches 68 and longitudinally opposite central slot 70 to form a generally chevron or U-shaped pattern of compacted mud on each of the shoes that tends to resist sideway movement thereof. This is in marked contrast to the full width and length entrapment of mud between the double grousers of a conventional shoe. Such chevron shaped mud pattern is outlined by the broken lines identified by the letter P in FIG. 2. In addition, however, increased resistance to side slipping is provided by the inclined shoulders 56 and the inclined shoulder 62. Thus, while the side edges 36 and 38 and grouser end wall 66 resist sideway movement in a normal manner, additional resistance is provided by the action of both of the inclined shoulders 56 and 62, and by the U-shaped mud pattern adhering to the flat wear surface under relatively severe operating conditions.

The track shoes 12 of the present invention appropriately balance the increased tractive effort with the lateral stiffness of the relatively wide shoes. Preferably, the width of the leading grouser 50 is between 15% and 24% wider than the central slot 70 between the trailing grousers 52. This serves to define the overlap identified by the letter E in FIG. 3, which results in a marked increase in stiffness of the longitudinal section thereat when compared to a shoe having little or no overlap at all. Accordingly, the track shoes of the present invention exhibit relatively high lateral beam strength for improved service life in high impact rock work, while simultaneously retaining an ability to exert high drawbar pull in mud due to their self-cleaning tendency and the increased longitudinal distance between the respective grousers of adjacent track shoes. Such increased longitudinal distance between the grousers 50 or 52 of the relatively short length adjacent shoes, through their respective slots 70 or end notches 68, beneficially contributes to better traction through a soil shearing pattern having an increased longitudinal dimension and greater depth.

It will be appreciated that the track shoes 12 of the present invention exhibit excellent flotation because the full width and full area of the flat outer wear surface 30 supports the load. Further, since the staggered grousers 50 and 52 are disposed fully peripherally within this rectangular outer wear surface, the peripherally clean side edges 36 and 38 of the shoes enable them to be positioned laterally close to the body portion of the vehicle on which they are mounted or close to the side of a building or other article on the ground.

While the invention has been described and shown with particular reference to a preferred embodiment, it will be apparent that variations might be possible that would fall within the scope of the present invention, which is not intended to be limited except as defined in the following claims.

What is claimed is:

1. A track shoe with staggered grousers comprising;
an elongated rectangular planar body portion having a predetermined leading edge, a trailing edge, a pair of side edges, and a flat outer wear surface therewithin;
a leading grouser having a width of approximately 70% of the overall width of the shoe which extends integrally outwardly from said wear surface in parallel juxtaposed relation to said leading edge centrally thereof; and
a pair of laterally spaced trailing grousers having a collective width of approximately 40% of the overall width of the shoe which extends integrally outwardly from said wear surface in parallel juxtaposed relation to said trailing edge and laterally inwardly from said side edges to provide an overlap relationship of approximately 5% of the overall width with respect to said leading grouser and to cause adhering mud or the like to be released from entrapment between said leading grouser, said trailing grousers, and said outer wear surface for improved penetration and traction.

2. A track shoe with staggered grousers comprising;
an elongated rectangular planar body portion having a predetermined leading edge, a trailing edge, a pair of side edges, and a flat outer wear surface therewithin;
a pair of laterally spaced trailing grousers extending integrally outwardly from said wear surface in parallel juxtaposed relation to said trailing edge and laterally inwardly from side edges and defining a central slot between said trailing grousers and outwardly of said wear surface; and
a leading grouser extending integrally outwardly from said wear surface in parallel juxtaposed relation to said leading edge centrally thereof and with the width of said leading grouser being preferably between 15% and 24% wider than said central slot to retain a relatively high degree of lateral beam strength while also maintaining traction by release of adhering mud from entrapment between said leading grouser, said trailing grousers, and said outer wear surface.

3. A track shoe with staggered grousers comprising;
an elongated rectangular planar body porton defining a flat outer wear surface with a pair of opposite side edges;
a relatively wide leading grouser extending integrally outwardly from said wear surface of said body portion in a direction transversely of a predetermined travel direction of said shoe and in equally laterally spaced relation from said side edges; and a relatively narrower width pair of trailing grousers extending integrally outwardly from said wear surface in parallel relation to said leading grouser and extending transversely inwardly from said side edges to define a central slot therebetween to cause adhering mud or the like to be released from entrapment between said leading grouser, said trailing grousers, and said planar outer wear surface for improved penetration and traction, and to further define an overlap relationship between said leading grouser and said trailing grousers of 5% of the overall shoe width for increasing the lateral beam strength of the track shoe.

4. The track shoe of claim 3 wherein said leading grouser has divergingly inclined shoulders and wherein said trailing grousers have outer end walls coplanar with said side edges and inner convergingly inclined shoulders for improved resistance to sideway movement.

* * * * *